United States Patent [19]
Reedy

[11] 3,838,894
[45] Oct. 1, 1974

[54] ENDLESS DRIVE TRACK FOR SNOWMOBILES AND THE LIKE

[75] Inventor: Donald G. Reedy, Caro, Mich.

[73] Assignee: Special Sports Products Corporation, Caro, Mich.

[22] Filed: Dec. 26, 1972

[21] Appl. No.: 317,949

[52] U.S. Cl............... 305/35 EB, 305/5.4, 152/210
[51] Int. Cl............................................ B62d 55/26
[58] Field of Search ............ 305/35 EB, 37, 38, 54; 152/222, 210; 301/44 B, 43

[56] References Cited
UNITED STATES PATENTS

| | | | |
|---|---|---|---|
| 1,820,743 | 8/1931 | Honstain | 301/44 B X |
| 3,715,146 | 2/1973 | Robertson | 305/35 EB |
| 3,732,939 | 5/1973 | Samson | 180/5 R |
| 3,782,787 | 1/1974 | Rubel | 305/54 |

FOREIGN PATENTS OR APPLICATIONS

| | | | |
|---|---|---|---|
| 1,078,717 | 8/1967 | Great Britain | 305/38 |

OTHER PUBLICATIONS

Advertising Brochure, "Tracs," published for Roetin Ind., Rochester N.Y. 5/21/71.

Primary Examiner—Richard J. Johnson
Attorney, Agent, or Firm—John J. Swartz

[57] ABSTRACT

An endless drive track for snowmobiles and the like including an endless drive belt and a plurality of ice-gripping cleat assemblies randomly mounted on the belt. The cleat assemblies include hardened, ice-engageable wear members terminating in sharp, elongate, ice-shearing edges angularly disposed relative to each other.

18 Claims, 6 Drawing Figures

PATENTED OCT 1 1974 3,838,894

3,838,894

ENDLESS DRIVE TRACK FOR SNOWMOBILES AND THE LIKE

BACKGROUND OF THE INVENTION

This invention relates to traction increasing apparatus and more particularly to an endless drive track including cleat assemblies mounting ice-gripping wear members having ice-shearing terminal edges angularly disposed relative to each other.

Snowmobiles are conventionally driven by an endless, power-driven track which engages the surface to be traversed. When a snowmobile propelled by a conventional track negotiates ice or other similarly slippery surfaces, the track will slip and forward progress of the snowmobile will be impeded. Snowmobiles with conventional tracks are also difficult to control in turns as the track tends to slide sidewise across the slippery surface.

Outwardly opening, multi-pronged studs may be mounted on the drive track to improve traction, but unless the studs are of exceptionally hard material, they wear quickly and must be replaced. On the other hand, if the entire stud is made of hard material, the cost of the stud is exorbitant. Accordingly, it is an object of the present invention to provide an endless drive track for a snowmobile and the like including ice-gripping cleat assemblies mounting hardened wear members.

If the cleat assemblies are mounted on the track in longitudinal alignment, the aligned cleats follow in the same path of travel and tend to dig a longitudinal trench which reduces the gripping capabilities of the aligned cleat assemblies. Accordingly, it is an object of the present invention to provide an endless track for propelling a track-driven vehicle including cleat assemblies which are out of longitudinal alignment with each other.

Although the hardened wear members which shear the ice may be provided with conically shaped ice-gripping terminal ends, it has been found that hardened wear members with sharp elongate edges grip the ice more effectively, provide increased vehicle stability, and retain a sharpened edge for a longer duration. If the sharpened ice shearing edges of the various cleat assemblies are all parallelly aligned in a given direction, the traction capabilities of the drive track, in a direction normal to the edges, is maximum, but the traction capability in the given direction is minimum. Accordingly, it is an object of the present invention to provide an endless track for a track-driven vehicle having increased traction capabilities including cleat assemblies having hardened ice-gripping members terminating in ice shearing edges which are angularly disposed relative to thhe other ice-shearing edges.

When snowmobiles are racing, it is extremely important that the tracks be provided with cleat assemblies which have maximum lateral stability and which are mounted on the drive track so that any worn or broken cleat assemblies can be quickly and easily replaced. Accordingly, it is another object of the present invention to provide a cleat assembly including a stud having mounting threads at one end for threaded connection to an endless drive belt, a recess at the other end mounting a hardened ice shearing wear member, and a lateral wrench-receiving flange interjacent the two ends mounting a stud stabilizing plate which is disposed between the flange and the threaded end of the stud to laterally stabilize the stud when it is mounted on the belt.

Other objects and advantages of the present invention will become apparent as the description thereof proceeds.

SUMMARY OF THE INVENTION

An endless drive track for propelling a belt-driven vehicle, such as a snowmobile, comprising: an endless drive belt and a plurality of ground engageable cleat assemblies mounted on the drive belt, each cleat assembly including mount means on the drive belt; and a ground engageable wear member composed of harder material than the mount means, mounted on the mount means and having an elongate terminal edge for shearing the surface to be traversed, the edges being angularly disposed relative to each other.

Other objects and advantages of the present invention will become apparent to those of ordinary skill in the art from the following description when considered in relation to the accompanying drawings, in which.

DESCRIPTION OF THE PREFERRED EMBODIMENT

Figure 1:
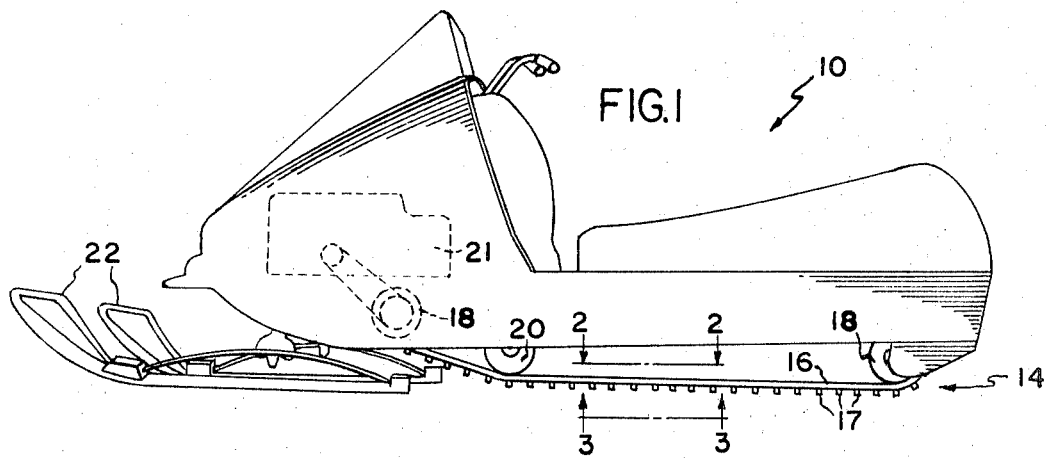
FIG. 1 is a perspective side view of a snowmobile mounting an endless drive track constructed according to the present invention.
Figure 2:
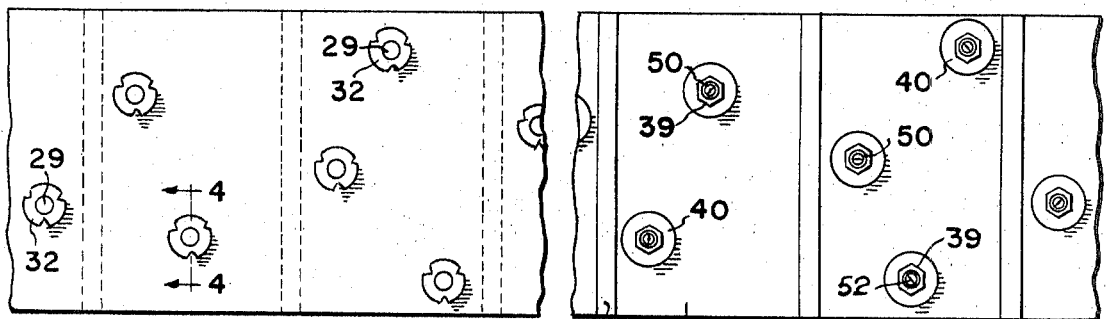
FIG. 2 is a partial top plan view of the lower run of the drive track constructed according to the present invention, taken along the line 2—2 of FIG. 1.

An endless drive track, generally designated 14, and constructed according to the present invention, is particularly adapted for supporting and driving a snowmobile, generally designated 10, and includes a resilient endless belt 16 of rubber or the like trained around a pair of end rollers 18 and an intermediate idler roller 20. The forward end roller 18 is driven by a gasolene powered engine, schematically designated 21, to drive the track and propel the vehicle 10 forwardly. A pair of steerable skis 22 are provided at the front of the machine 10 for steering the snowmobile as usual.

The belt 16, which includes a plurality of transversely extending integral lugs 17, has a plurality of apertures 24 between the lugs 17 and located such that they are not longitudinally or transversely aligned. Mounted in each of the apertures 24 is a cleat asssembly 26 including a stud 28 having a threaded shank 29 received in an aperture 24 and threadedly coupled to the internally threaded sleeve portion 30 of a stud mounting nut 32 having a flange 34 on the inside of the belt 16. The stud 28 may be machined from stainless steel stock. The mounting nut flange 34 includes a plurality of tangs 36 embedded in the drive belt 16 to prevent the nut from rotating. The stud 28 includes an enlarged, intermediate flange portion 38 having a plurality of wrench-receiving flats 39 defining a multiple sided head which may be accommodated in a socket wrench or the like used to turn the stud 28 about its longitudinal axis and thread the shank 29 into and out of the sleeve 30.

The intermediate stud flange 38 supports a stabilizing plate or washer 40, dished at its center and having a central aperture 41 therein press fitted on a non-threaded stud portion 42 adjacent the flange 38. The washer 40 includes a pair of apertures 44 throough which portions 16a of the belt 16 may bulge or protrude to assist in stabilizing the cleat. The washer 40 and flanged nut 32 resist any tendency of the cleat assembly 26 to tear out of the endless belt 16 as the belt drives the snowmobile.

The portion 46 of the stud 28 underlying the flange 38 is frustoconically shaped and includes an elongate central bore 48 receiving a hardened wear member or rod 50 fabricated from wear-resistant material such as tungsten, carbide, or the like. The diameter of the rod 50 is slightly greater than the initial diameter of the recess 48 so as to be received therein with a press fit. For example, the bore 48 has an initial internal diameter of 0.100 inch and is 0.300 inch deep, whereas the wear rod 50 has a diameter slightly greater than 0.100 inch and a length of 0.350 inch.

Figure 3:
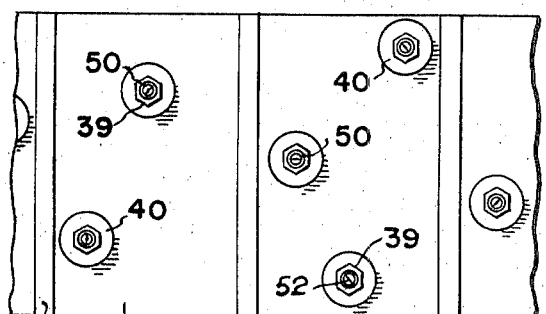
FIG. 3 is a partial bottom plan view of the lower run of the drive track, taken along the line 3—3 of FIG. 1.
Figure 4:
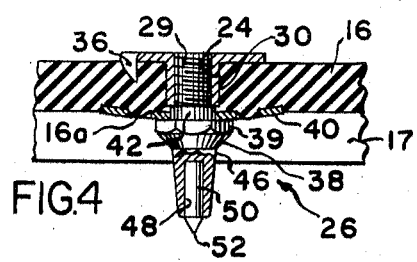
FIG. 4 is a partial sectional end view of the track and cleat assembly, taken along the line 4—4 of FIG. 1.
Figure 5:
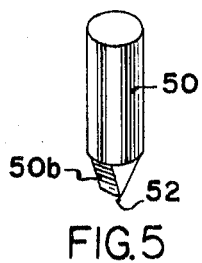
FIG. 5 is a perspective view of a hardened wear member incorporated in the cleat assembly constructed according to the present invention.
Figure 6:
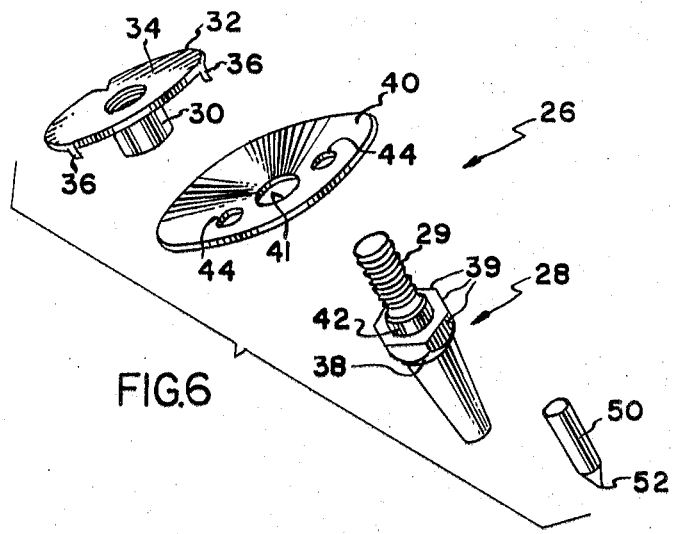
FIG. 6 is a perspective, exploded view of a cleat assembly constructed according to the present invention.

The terminal portion of the carbide wear rod 50 has outwardly converging side faces 50b terminating in a sharp, elongate ice-shearing edge 52. Present racing standards limit the included angle between the side faces 50b to not less than 60°. Because the tungsten carbide material of the wear rod 50 is relatively hard, the chisel-pointed wear rod 50 remains sharp for relatively long periods of time and digs in the ice to provide good traction and stabilize the snowmobile. The relative positions of the nuts 24, the carbide wear rods 50, and the studs 28 are such that the sharp edges 52 are angularly disposed relative to each other as is best illustrated in FIG. 3. If sufficient holes are randomly placed in the track, the random placement of the edges 52 will provide adequate gripping. Tungsten carbide material having a hardness within the range of 80 – 90 on the Rockwell R.A. hardness scale has been found suitable for the wear rods.

METHOD OF ASSEMBLY

To assemble the snowmobile track, the apertures 24 are cut or punched into the belt 16 so that they are neither longitudinally nor transversely aligned. The nuts 24 are then placed on the inside of the belt 16 with the sleeves 30 received in the apertures 24.

The stabilizing washers or plates 40 are then placed over the threaded stud ends 29 and press fitted onto the stud portions. The threaded portions 29 of the studs 28 are then threaded into the sleeves 30 of the nut 32 by means of a wrench, until the tangs 36 are eembedded in the belt 16 on one side of the belt and the flexible material 16a of the belt 16 extends through the apertures 44 in the washers 40 on the other side of the belt. The washers 40 will be prevented from rotating by the material 16a, but will be moved axially toward the belt 16 as the stud is threaded intto the nut 32.

The carbide wear rods 50 are then press fitted into the stud bores 48 so that the edges 52 are angularly disposed relative to each other. On the other hand, the carbide wear rods 50 may be inserted into the bores 48 prior to installation of the studs 28 in the bores 24. In this case, the nuts 24 are so located that when the studs 28 are fully turned into the nuts, the sharp edges 52 are angularly disposed relative to each other to provide stability of the track in all directions.

The cleat assemblies can be utilized when the snowmobile travels over surfaces other than ice, but they can also be removed from the track if the snowmobile will not encounter ice or otherwise slippery surfaces for a sustained period.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. An endless drive track for propelling a track-driven vehicle, such as a snowmobile, comprising:
 a drive belt movable in an endless path of travel; and
 a plurality of independent ground engageable cleat assemblies mounted in laterally spaced relation along the length of said drive belt;
 each cleat assembly including:
  mount means having an inner end mounted on said drive belt and an outer end provided with an elongate receptacle;
  a ground engageable, elongate, wear member, composed of material harder than that of said mount means, having a longitudinally inner portion snugly received in said receptacle and a longitudinally outer, projecting portion provided with opposed side faces which converge outwardly and terminate at an elongate sharp, ground engaging chisel edge for shearing the surface to be traversed, said edge being continuous and extending between the opposed side surfaces of said wear member which are on opposite sides of a plane that passes through said wear member and is disposed perpendicularly to said edge.

2. A drive track according to claim 1 wherein said edges are so oriented that not all of them are normal to or parallel to said path.

3. The track as set forth in claim 1 wherein said wear member comprises a longitudinal stud having a longitudinal axis, said side faces being disposed on diametrically opposite sides of said axis.

4. An endless drive track for propelling a track-driven vehicle such as a snowmobile comprising:
 an endless drive belt movable along a path; and
 a plurality of ground engageable cleat assemblies mounted on said drive belt;
 each cleat assembly including:
  mount means on said drive belt;
  a ground engageable stud wear member, composed of material harder than that of said mount means, mounted on said mount means and terminating in an elongate chisel edge for shearing the surface to be traversed;
  the terminal chisel edges of said plurality of cleat assemblies being angularly disposed relative to each other and oriented so that not all of said edges are normal or parallel to said path; said cleat assemblies being positioned out of longitudinal alignment with each other.

5. The drive track set forth in claim 4 wherein each of said mount means includes a transversely and outwardly extending mounting member defining a receptacle receiving said wear member.

6. The drive track set forth in claim 4 wherein said mount means includes a lateral flange between said edge and said belt, and a stabilizing plate is sandwiched between said lateral flange and said drive belt.

7. The drive track set forth in claim 6 wherein said stabilizing plate includes apertures therein receiving portions of said belt to prevent movement of said plate about the axis of said stud; said stabilizing plate being press-fitted on a portion of said mount means interjacent said inner and outer ends aand bearing against the side of said flange adjacent said belt.

8. The drive track as set forth in claim 4 wherein said belt includes a plurality of transversely extending ground engaging lugs spaced along the length thereof, said cleat assemblies being mounted on said belt interjacent said lugs.

9. The endless drive track as set forth in claim 4 wherein said mount means includes an elongate stud removably coupled to said belt and extending generally normal to the plane of said belt, each of said studs including a stud wear member receiving recess in its outer end and a flange adjacent said belt; said stud wear member having one end received in said recess and an outer end terminating in said chisel edge; and a stabilizing plate is sandwiched between said flange and said belt to stabilize said stud when it engages said surface.

10. The track of claim 4 wherein said mount means comprises an elongate stud extending generally normal to said belt and having an elongate bore at the terminal end thereof; said stud wear member comprising a rod having an inner end received by said bore and an outer end having converging sides terminating in said edge, the included angle between said sides being substantially equal to 60°.

11. The drive track set forth in claim 10 wherein said elongate stud has flat surfaces interjacent said inner and outer end portions to receive a stud turning wrench for turning the stud about its axis; said side walls of said stud being outwardly convergent, said rod being press-fitted in said bore.

12. A cleat assembly for increasing the traction capabilities of a track-driven vehicle comprising:
a stud wear member for engaging a surface to be traversed including inner and outer end portions;
means for mounting said wear member on the outer face of an endlessly driven track of a track-driven vehicle including an inner end for connecting to the track and an outer end mounting the inner end portion of said stud wear member;
said stud wear member being composed of material which is harder than said mounting means;
said outer end portion of said stud wear member being disposed outwardly of said mounting means and including opposed side surfaces converging outwardly to define, at the outermost end of said stud wear member, a sharp, ground engaging, elongate cutting edge which extends continuously between the opposed side surfaces of said wear member which are on opposite sides of a plane that passes through said wear member and extends perpendicularly to said edge.

13. A cleat assembly as set forth in claim 12 wherein said wear member comprises a single longitudinal piece of material having a longitudinal axis, said cutting edge lying in a plane intersecting the longitudinal axis of said wear member and being substantially shorter than the length of said wear member.

14. A cleat assmbly as set forth in claim 13 wherein said inner end includes a single, elongate threaded shank mounted for rotation about said axis.

15. A cleat assembly as set forth in claim 14 wherein said mounting means comprises an elongate recess at the opposite end receiving said wear member and a load bearing flange interjacent said ends.

16. The cleat assembly as set forth in claim 14 further including a stabilizing plate received on said shank and bearing against the side of said flange adjacent said threaded end of said stud, said flange including wrench receiving means for receiving a tool adapted to turn said stud about said axis.

17. The cleat assembly as set forth in claim 12 wherein said stud wear member comprises a longitudinally extending cleat having a longitudinal axis and a greater length than breadth, said first-mentioned side surfaces being disposed on diametrically opposite sides of said axis.

18. The cleat assembly as set forth in claim 17 wherein the included angle between said converging side surfaces is substantially equal to 60°.

* * * * *